July 27, 1965

R. W. MONGEON 3,197,703

COMPACT MICROWAVE ASSEMBLY FOR ACCOMPLISHING FREQUENCY
CONVERSION IN ELECTROMAGNETIC WAVE TRANSMITTING
AND RECEIVING SYSTEM

Filed Nov. 16, 1962

INVENTOR.
RONALD W. MONGEON
BY
John H. Gallagher
ATTORNEY

United States Patent Office 3,197,703
Patented July 27, 1965

3,197,703
COMPACT MICROWAVE ASSEMBLY FOR ACCOMPLISHING FREQUENCY CONVERSION IN ELECTROMAGNETIC WAVE TRANSMITTING AND RECEIVING SYSTEM
Ronald W. Mongeon, San Jose, Calif., assignor to Sperry Rand Corporation, Great Neck, N.Y., a corporation of Delaware
Filed Nov. 16, 1962, Ser. No. 238,093
8 Claims. (Cl. 325—24)

This invention relates to a small and compact hollow waveguide device that includes as an integral part of its structure apparatus for converting the frequency of electromagnetic waves of one plane of polarization and additional apparatus for converting the frequency of electromagnetic waves of an orthogonal plane of polarization, wherein the first converting apparatus internally generates and transmits a cross-polarized signal component for use as a local oscillator signal in the second one of said converters.

The present invention is particularly useful in a frequency modulated continuous wave radar system that transmits electromagnetic waves of one plane polarization and receives reflected waves polarized orthogonally to the transmitted waves. One type of frequency modulated continuous wave (FMCW) radar system for deriving aircraft height and velocity data is disclosed in U.S. patent application S.N. 188,754, filed April 19, 1962, by S. H. Black, D. Littler, and P. G. Smith, and assigned to applicant's assignee. In such a system, a sample of the transmitted signal at a first polarization angle and a signal from an external heterodyning signal source are coupled to a single sideband modulator circuit whose output signal is in turn coupled to a mixer circuit where it is heterodyned with the cross-polarized received signal to produce an I.F. signal. Individual waveguide apparatus for performing each of these described functions can become quite bulky and require a considerable amount of space on an aircraft. This may restrict the utility of an FMCW airborne radar system since aircraft equipment must meet rather strict requirements as to size and weight.

It, therefore, is an object of this invention to provide a small and compact waveguide device that includes apparatus for operating as a single sideband modulator and apparatus for operating as a mixer, said modulator operating in response to the transmitted signal of one polarization angle to produce within the waveguide a local oscillator signal that is heterodyned in the mixer with the received signal at an orthogonal polarization angle.

Another object of this invention is to provide a hollow waveguide device that includes as an integral part of the structure apparatus adapted to produce a local oscillator waveguide signal from the transmitted signal, and adapted to couple this local oscillator signal to signal mixing apparatus included therein which heterodynes the local oscillator signal and the received signal.

A further object of this invention is to provide a simple and compact waveguide structure for converting the frequency of orthogonally polarized waves simultaneously present within the structure, wherein the output signal of one converting means is used as a waveguide heterodyning signal in the convertor for the orthogonally polarized signal.

The present invention will be described by referring to the accompanying drawings wherein.

Figure 1:
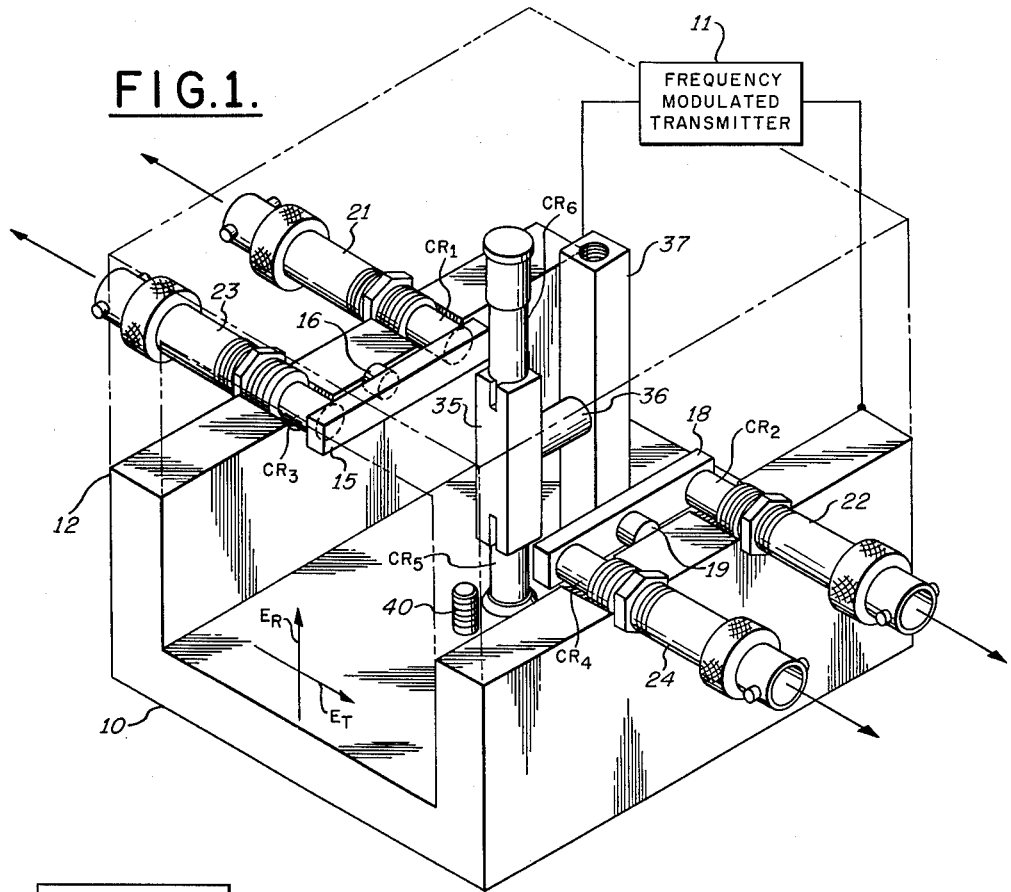
FIG. 1 is a perspective view, partially cut away, of the novel waveguide device of the present invention.

Referring now in particular to FIG. 1, the device of this invention includes a section of hollow waveguide 10 having a square cross-sectional configuration and adapted to freely propagate horizontally polarized frequency modulated waves $E_T$ from transmitter 11, and adapted to freely propagate vertically polarized waves $E_R$ received from a dual polarization antenna (not shown) that may be coupled to end 12 of hollow waveguide 10. Both the transmitted waves $E_T$ and the received waves $E_R$ propagate in their dominant modes, i.e., the $TE_{01}$ and $TE_{10}$ modes, respectively.

A four diode single sideband modulator that includes crystal diodes $CR_1$, $CR_2$, $CR_3$, and $CR_4$ serves to heterodyne the horizontally polarized transmitted signal $E_T$ with a lower frequency externally supplied heterodyning signal to produce a single sideband local oscillator signal that is present within waveguide 10. Crystal diodes $CR_1$ and $CR_2$ are included in one balanced modulator of the single sideband modulator, and crystal diodes $CR_3$ and $CR_4$ are included in the other balanced modulator of the single sideband modulator. A longitudinally-extending conductive bar 15 and a conductive spacer bar 16 positioned between bar 15 and the inner wall of waveguide 10 provide respective coupling loops for coupling crystal diodes $CR_1$ and $CR_3$ to the horizontally polarized frequency modulated transmitted signal $E_T$, and also provide a D.C. current path to ground for crystal diodes $CR_1$ and $CR_3$. A similar arrangement of the longitudinally-extending conductive bar 18 and conductive spacer bar 19 perform corresponding functions with respect to crystal diodes $CR_2$ and $CR_4$. Crystal diodes $CR_3$ and $CR_4$ are longitudinally spaced along the waveguide from crystal diodes $CR_1$ and $CR_2$, respectively, by an electrical length substantially equal to $$\frac{(2n-1)}{4}\pi$$

wherein $n$ is an integer and $\pi$ is the waveguide wavelength of the mean frequency of the frequency modulated transmitted signal $E_T$. Each of the crystal diodes $CR_1$–$CR_4$ is housed within a respective crystal holder 21–24 that provides means for coupling the externally supplied heterodyning signal to each of the respective diodes.

Figure 2:
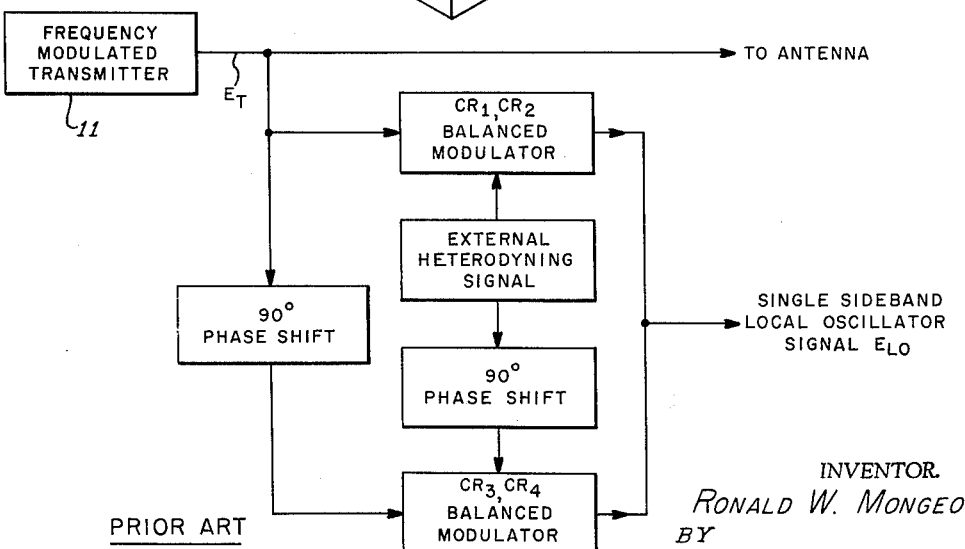
FIGS. 2 and 3 are block and schematic diagrams, respectively, of the single sideband modulator portion of the present invention.
Figure 3:
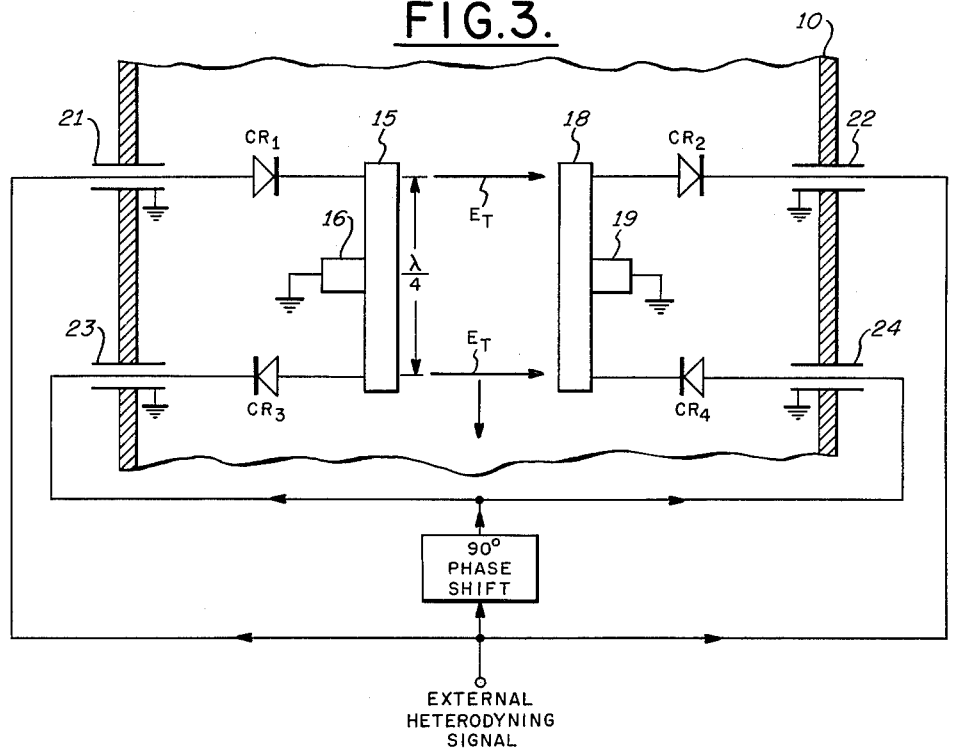

A block diagram of the single sideband modulator comprised of crystal diodes $CR_1$–$CR_4$ is illustrated in FIG. 2. It will be seen in FIG. 2 that the frequency modulated transmitted signal $E_T$ that is supplied to the balanced modulator comprised of crystal diodes $CR_3$ and $CR_4$ is shifted in phase by 90° with respect to the transmitted signal $E_T$ that is coupled to the balanced modulator comprised of crystal diodes $CR_1$ and $CR_2$. Similarly, the external heterodyning signal applied to crystal diodes $CR_3$ and $CR_4$ is shifted in phase by 90° with respect to the external heterodyning signal applied to crystal diodes $CR_3$ and $CR_2$. The schematic representation of the signal sideband modulator of FIG. 2 is illustrated in FIG. 3 and is helpful in understanding the phase relationships of the various signals that excite crystal diodes $CR_1$–$CR_4$. For example, crystal diodes $CR_1$ and $CR_2$ are oppositely poled with respect to the external heterodyning signal and are excited in phase with respect to each other by the horizontally polarized transmitted signal $E_T$. Crystal diodes $CR_3$ and $CR_4$ are also oppositely poled with rsepect to the external heterodyning signal, are excited in phase with respect to each other by the transmitted signal $E_T$, and are oppositely poled with respect to crystal diodes $CR_1$ and $CR_2$. As seen in FIG. 3, crystal diodes $CR_3$ and $CR_4$ are excited by the external heterodyning signal 90° out of phase with the excitation of crystal diodes $CR_1$ and $CR_2$. Similarly, because of the quarter wavelength spacing of the two pairs of diodes in waveguide section 10, crystal diodes $CR_3$ and $CR_4$ are excited by the transmitted wave $E_T$ 90° out of phase with respect to the excitation of crystal diodes $CR_1$ and $CR_2$. In practice, the 90° phase shift introduced in the external heterodyning signal will be accomplished externally to the waveguide device of this invention. This single sideband modulator circuit is known in the art and will not be further described. Although the disclosed four diode single sideband modulator presently is preferred, other types of modulators might be used, provided they can produce a cross-polarized output signal component.

The balanced mixer for heterodyning the internally-generated local oscillator signal $E_{LO}$ and the vertically polarized received signal $E_R$ includes crystal diodes $CR_5$ and $CR_6$ conductively connected and physically supported by the vertical conductive rod 35. Rod 35 is in turn conductively connected to and physically supported by the horizontal conductive bar 36 and the vertical conductive bar 37 that extends between and is in electrical contact with the top and bottom walls of square waveguide 10. Conductive members 35, 36 and 37 function electrically to provide a crystal current path to ground. Vertical bar 37 is spaced an odd number of quarter waveguide wavelengths from crystal diodes $CR_5$ and $CR_6$. Because the mixer structure comprised of crystal diodes $CR_5$ and $CR_6$ and conductive bars 36 and 37 extend traversely to the electric field $E_T$ they will not significantly interfere with the propagation of the transmitted waves $E_T$ through square waveguide 10 and will not couple to these horizontally polarized waves. Crystal diodes $CR_5$ and $CR_6$ will, however, couple to the vertically polarized electric field $E_R$ of the received signals, and the quarter wavelength spacing of conductive bar 37 will maximize the coupling in the well known manner. Mixer diodes $CR_5$ and $CR_6$ are longitudinally positioned midway between the pairs of diodes $CR_1$, $CR_2$, and $CR_3$, $CR_4$ in order to assure the presence there of only single sideband signals from the single sideband modulator.

Tuning post 40 is located on the bottom wall of waveguide section 10 and provides means for matching the impedance presented by crystal diode $CR_5$ to the impedance of waveguide section 10. A similar tuning post may be located on the opposite wall adjacent crystal diode $CR_6$ to match that crystal diode to the waveguide.

Figure 4:
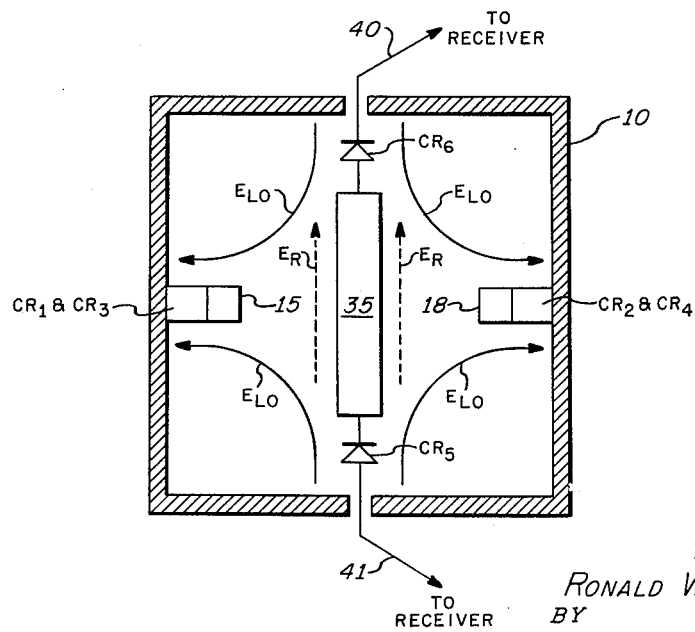
FIG. 4 is a schematic representation of the propagating mode of the single sideband local oscillator signal and of the balanced mixer for heterodyning the local oscillator signal with the received signal.

In the operation of the compact waveguide assembly of FIG. 1, frequency modulated waves from transmitter 11 are coupled into waveguide section 10 as horizontally polarized waves, and a portion thereof, determined by the depth of penetration of conductive rods 15, 16, 18 and 19 into waveguide section 10, are coupled to the respective pair of crystals $CR_1$, $CR_2$ and $CR_3$, $CR_4$. The horizontally polarized transmitter waves $E_T$ will not couple to crystal diodes $CR_5$ or $CR_6$ since they extend traversely to the electric field. With the external heterodyning signals applied to crystal diodes $CR_1$–$CR_4$ with the relationship illustrated in FIG. 3, the diodes function as a single sideband modulator whose output signal $E_{LO}$ propagates in the $TE_{11}$ mode in the region of waveguide section 10 occupied by crystal diodes $CR_5$ and $CR_6$, as illustrated in FIG. 4. The excitation of the $TE_{11}$ mode having the cross-polarized electric field components results from unbalanced current flow in diodes $CR_1$–$CR_4$ due to the external heterodyning signals applied thereto. The single sideband signal $E_{LO}$ has electric field components parallel to crystal diodes $CR_5$ and $CR_6$ and serves as a local oscillator signal for the balanced mixer comprised to crystal diodes $CR_5$ and $CR_6$, and as illustrated in FIG. 4, excites these two diodes in phase opposition. Vertically polarized received signal $E_R$ excite crystals $CR_5$ and $CR_6$ in like phase in order that these diodes may operate in the well known manner to perform the function of a balanced waveguide mixer. Conductive post 37 functions as a short circuit to the vertically polarized received signal $E_R$ and because of its quarter wave spacing enhances the coupling of the received signal $E_R$ to crystal diodes $CR_5$ and $CR_6$. The mixer output signal on conductors 40 and 41 is a heterodyned signal at the I.F. frequency, which is further operated upon in the radar system to produce height and velocity data, in the manner disclosed in the above-mentioned application S.N. 188,754.

The combination of the single sideband modulator operating on waves of one polarization and the balanced mixer operating on orthogonally polarized electric waves results in the simple and compact physical structure illustrated in FIG. 1 and is made possible by the excitation of the local oscillator signal in a waveguide mode that has components parallel to the orthogonally polarized received waves $E_R$. By virtue of this fact, the mixer comprised of crystal diodes $CR_5$ and $CR_6$ may be an auto mixer that requires no further waveguide components. Thus, a frequency modulated transmitter such as a klystron may be directly coupled to the back end of waveguide section 10 and a dual polarization horn may be coupled to the front end of the section, and no further microwave circuitry is required. Further contributing to the feasibility of the device of this invention is the type of coupling mechanism utilized for coupling to the crystal diodes. Not only must the coupling mechanisms not interfere with the propagation of orthogonally polarized waves, but also a high degree of isolation must be maintained between waves of the two polarization angles. This compact structure obviously is an important advantage in airborne radar systems.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A compact waveguide assembly for use in a dual polarization electromagnetic wave transmitting and receiving system comprising the combination of, a section of hollow conductively bounded waveguide for propagating plane polarized electromagnetic waves throughout a given frequency range in orthorgonally polarized propagating modes, one end of said waveguide section being adapted to be coupled to a source of electromagnetic waves within a given frequency range and plane polarized at a first angle of polarization, first and second signal mixing means coupled through said waveguide at diametrically opposite positions to be excited by electromagnetic waves propagating within said waveguide at said first polarization angle, third and fourth signal mixing means respectively spaced along said waveguide an odd integral number of quarter waveguide wavelengths from said first and second signal mixing means and coupled through said waveguide at diametrically opposite positions to be excited solely by said waves within said waveguide at said first angle of polarization, means for coupling each of said signal mixing means to an external heterodyning signal with the proper phase relationship to mix said signals coupled thereto and produce a single sideband signal propagating in said waveguide with electric field components at a second polarization angle orthogonal to said first polarization angle, fifth and sixth signal mixing means coupled to said waveguide to be excited by said orthogonal components of said single sideband signal propagating within said waveguide and to be excited by electromagnetic waves at said second polarization angle coupled into the other end of said waveguide section.

2. A compact waveguide assembly for use in a dual polarization electromagnetic wave system comprising the combination of, a longitudinally-extending section of waveguide having a square-cross section for propagating orthogonal linearly polarized electromagnetic waves within a given frequency range,
   a first pair of signal mixing elements longitudinally-spaced along one wall of said waveguide and in energy coupling relationship with electromagnetic waves of a first linear polarization propagating in said waveguide,
   said signal mixing elements being longitudinally-spaced by a distance substantially equal to an odd number of quarter waveguide wavelengths at a frequency in said given frequency range,
   a second pair of signal mixing elements similarly positioned along the opposite wall of said waveguide and in coupling relationship with the waves of said first polarization,
   said signal mixing means being adapted to receive external heterodyning signals,
   said signal mixing means being so arranged and so coupled with respect to the electromagnetic waves of said first polarization and with respect to said external heterodyning signals as to generate within said waveguide a single sideband signal that propagates in a waveguide mode having at least a portion of its electric field components polarized orthogonally to the waves of said first polarization, and
   a third pair of signal mixing elements coupled to said waveguide in a manner to be energized by the orthogonal electric field components of said single side band signal.

3. A compact waveguide assembly for use in a dual polarization electromagnetic wave radiating and receiving system comprising the combination of,
   a section of hollow conductively bounded waveguide for propagating plane polarized electromagnetic waves throughout a given frequency range is orthogonally polarized propagating modes,
   a first pair of crystal mounting means respectively positioned in opposite walls of said waveguide and adapted to support crystal diodes therein,
   a second pair of crystal mounting means similarly positioned in said opposite walls and spaced along said waveguide from said first pair by an odd multiple of a quarter waveguide wavelength at a frequency within said given frequency range,
   said second pair of crystal mounting means adapted to support a second pair of crystal diodes therein,
   a plurality of coupling means respectively associated with the crystal mounting means on said opposite walls for coupling electromagnetic waves of a first one of said polarizations to each of said crystals and adapted to provide a crystal current path to a respective waveguide wall,
   means extending between the other pair of opposite walls of said waveguide in the region occupied by said first and second pairs of crystals for supporting a third pair of crystals and providing means for coupling to said crystals electromagnetic waves polarized orthogonally to said first polarization.

4. The combination claimed in claim 3 wherein,
   each crystal diode associated with said first and second pairs of crystal mounting means is oppositely poled with respect to the other crystal diode of its pair and the crystal diodes associated with a respective wall of said waveguide are oppositely poled with respect to each other, said combination further including,
   means for exciting said first and second pairs of crystal diodes in quadrature with an external heterodyning signal,
   whereby electromagnetic waves of said first polarization are incident on the crystals of the said first and second pairs and said heterodyning signal is incident on each crystal of said two pairs in the correct phase relationship to produce within said waveguide a single sideband signal component propagating in the $TE_{11}$ waveguide mode,
   said $TE_{11}$ waveguide mode exciting said third pair of crystals with respective components of opposite phase relationship.

5. The combination claimed in claim 4 and further including,
   electromagnetic wave transmitter means coupled to one end of said waveguide for coupling thereto electromagnetic waves of said first polarization, and
   dual polarization antenna means coupled to the other end of said waveguide for radiating electromagnetic waves of said first polarization and for coupling to said waveguide electromagnetic waves of said orthogonal polarization.

6. A compact waveguide assembly for use in conjunction with a heterodyning signal source to produce frequency conversion of waveguide propagated electromagnetic waves of a first polarization, the frequency converted electromagnetic waves having components in a second orthogonal polarization which in turn are employed to produce frequency conversion of orthogonally polarized waveguide propagated electromagnetic waves, said combination comprising,
   a section of waveguide for propagating electromagnetic waves of first and second orthogonal polarizations,
   a first pair of frequency converting means disposed intermediate the ends of said waveguide in wave coupling relationship with waves in said waveguide having said first polarization,
   a second pair of frequency converting means disposed intermediate the ends of said waveguide in wave coupling relationship with waves in said waveguide having said first polarization and spaced along said waveguide from said first pair by an odd multiple of a quarter waveguide wavelength,
      said two pairs of frequency converting means being adapted to be coupled to said heterodyning signal source, and
   a third pair of frequency converting means disposed intermediate the ends of said waveguide in wave coupling relationship with waves in said waveguide having at least components polarized parallel to said second orthogonal polarization.

7. A compact waveguide assembly for use in a dual polarization electromagnetic wave system comprising the combination,
   a section of conductively bounded waveguide adapted to propagate electromagnetic waves within a given frequency range and polarized in orthogonal electromagnetic field modes,
   first and second pairs of signal mixing elements respectively coupled through the conductive boundary of said waveguide at diametrically opposite regions of the waveguide intermediate its two ends,
      the second element of each pair being spaced along said waveguide from its respective first element by an electrical distance substantially equal to an odd multiple of a quarter waveguide wavelength, and
   a third pair of signal mixing elements coupled through the conductive boundary of said waveguide intermediate its two ends in a manner to be excited only by electromagnetic waves polarized parallel to the second one of said orthogonal electromagnetic field modes.

8. The combination claimed in claim 7 wherein said third pair of signal mixing elements is longitudinally positioned along said waveguide intermediate the signal mixing elements of said first two pairs.

References Cited by the Examiner

UNITED STATES PATENTS 2,863,042　12/48　Sanders _____ 325—446
3,001,143　9/61　Bruck _____ 325—445

DAVID G. REDINBAUGH, *Primary Examiner.*